United States Patent Office 3,291,849
Patented Dec. 13, 1966

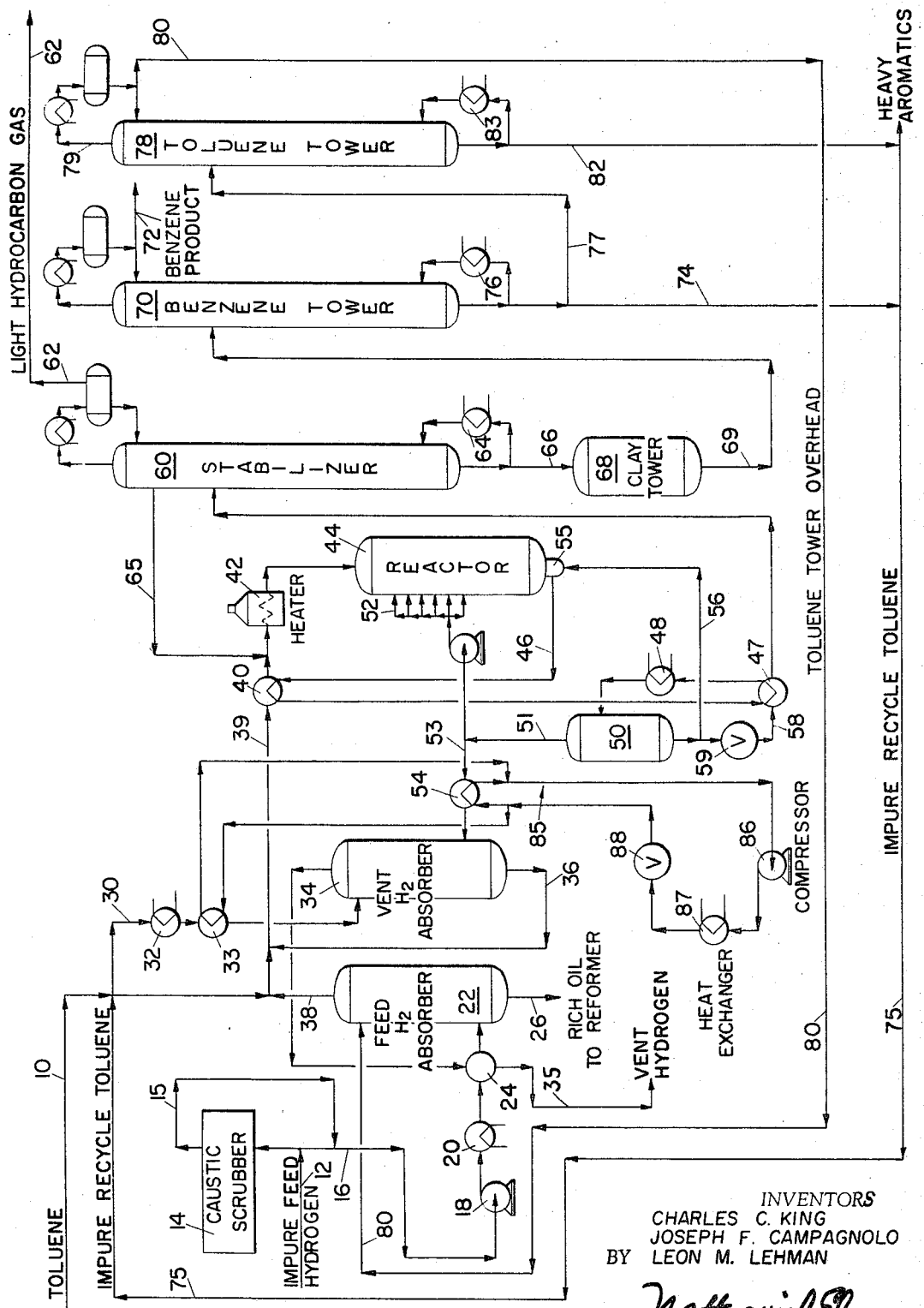

3,291,849
HYDRODEALKYLATION
Charles C. King, Paris, France, Joseph F. Campagnolo, Oradell, N.J., and Leon M. Lehman, Brooklyn, N.Y., assignors to Hydrocarbon Research, Inc., New York, N.Y., a corporation of New Jersey
Filed Nov. 16, 1964, Ser. No. 411,500
6 Claims. (Cl. 260—672)

The invention relates to a process for the hydrodealkylation of alkylated aromatic hydrocarbons such as toluene to produce benzene.

The hydrodealkylation of alkylbenzenes to produce benzene has been proposed and some processes have reached the commercial stage. In many of these processes a catalyst is used. However, in this invention alkylbenzenes, preferably toluene, are selectively converted to benzene without use of catalyst by utilizing a preferred correlation of time, temperature and pressure of the reactants in the reactor along with a preferred recycle of unconverted products. Obviously this avoids the extra costs associated with catalysts in commercial units.

One of the major problems associated with the design of hydrodealkylation reactors is temperature control. This is due to the highly exothermic nature of the reaction. Too high a temperature will result in loss of product yield as well as seriously increasing metallurgical problems. Too low a temperature will require an excessively large reactor volume. Consequently, the reactor must be quenched to maintain temperatures close to the optimum throughout the reactor.

It is possible to quench this reactor by using part of the cold feed as the quenching agent. This method has the obvious disadvantage that the part of the feed used for quench by-passes part of the reactor. Furthermore, the use of a reactive material as the feed for quench is questionable. Instead of using feed as quench, it is possible to use benzene product. This requires costly distillation to separate the product from unconverted liquid reactor effluent. It may also result in some loss of product. Use of any liquid as quench into the reactor necessarily involves a distribution problem which is particularly severe as any suitable liquid vaporizes under the reactor conditions.

In this invention recycle gas from the reactor effluent flash drum is used to quench the reactor. Feed hydrogen could also be used if available in sufficient quantity and at high purity. However, normally, feed hydrogen, where available, is at a lower pressure than recycle gas and thus compression costs are greater.

The reactor effluent also must be quenched immediately upon leaving the reactor in order to prevent product degradation and possible coking of the effluent. Here a liquid quench is suitable and desirable as liquid quench requires less volume than a gas quench. The most appropriate quench material is liquid from the reactor flash drum. Utilizing this material as quench eliminates the need for equipment to separate quench from reactor effluent. In addition, the quench pump requires only the low head that is necessary to overcome the pressure drop between the reactor and the flash drum.

An important consideration in a flowsheet for the hydrodealkylation of alkylated aromatic hydrocarbons is the handling of the effluent vapor. This vapor contains a substantial amount of benzene. The exact amount is, of course, a function of the amount of net effluent gas as well as the temperature and pressure of the effluent flash drum. However, the benzene in this effluent can be in the range of 5–10% of the total benzene production.

One method to reduce this loss in accordance with our invention is to contact the effluent vapor with all or part of the incoming alkylbenzene feed. If the feed is toluene, the benzene in the vapor can be essentially completely recovered, but it will be replaced by a toluene loss equal to approximately 40% of the recovered benzene. Thus the loss of product has been replaced by a smaller, though still significant, loss of feedstock.

This significant loss of feedstock can be substantially reduced by lowering the operating temperature of the absorber. However, because of the high freezing point of benzene, the effluent vapor must not be cooled too far.

Obviously, the greater the quantity of the alkylbenzene feedstock used as lean oil in the absorber, the greater will be the benzene recovery. However, in addition to absorbing benzene, this lean oil will also absorb light paraffins, especially butanes and pentanes, from the effluent and thus return them to the reactor. Therefore, the part of the feedstock used for lean oil to this absorber should be minimized to that required to absorb the bulk of the benzene in the effluent vapor.

In this present invention the effluent vapor is contacted with a part of the total feed to the hydrodealkylation reactor. The contacting takes place in a conventional absorber operating between 40°–60° F. The lean oil to vapor feed is maintained in a molar ratio between .005 to .025 where the system pressure is 550 p.s.i.g.; for other pressures the rate limits are adjusted inversely proportional to the operating pressure.

In many applications, particularly where a unit is installed in a petroleum refinery, the makeup hydrogen contains significant quantities of butanes and heavier paraffinic hydrocarbons. Under the conditions of the hydrodealkylation reactor these materials are hydrocracked primarily to methane and ethane. This can greatly increase the amount of makeup hydrogen required. Furthermore, it can create a problem of temperature in the reactor and in the heater preceding the reactor.

To minimize this problem the feed gas can be purified in an absorber using a part of the incoming alkylbenzene feed as the lean oil. This purification differs from the above purification of effluent gas in that here the purified gas goes to the reactor and the rich oil is removed from the hydrodealkylation system. In a refinery this rich oil would be first stabilized and then either used as gasoline or sent to a unit that would recover the alkylbenzene feed. Therefore, the lean oil used for the feed gas absorber must be free of the condensed heavy aromatics present in small concentrations in reactor effluents. Thus, while fresh alkylbenzene feed can be used, recycle feed requires the elimination of the condensed heavy aromatics by prior purification.

Clearly it is advantageous to minimize the alkylation feed lost to the rich oil. This can be done by operating the absorber below ambient temperature. However, this point is not as critical in a refinery as the necessity of minimizing the temperature in the absorber handling the net effluent vapor. This results from the fact that in the present case any alkylbenzene in the rich oil can either be recovered or remains as a valuable gasoline blending component; in the other case it is lost to fuel gas.

A particularly simple scheme, as hereinafter set forth by us, is to cool the net effluent by refrigerant to the desired temperature for its absorber. The net effluent leaving the absorber is then used to cool the makeup hydrogen going to its absorber. This system is admittedly less efficient thermodynamically than having each stream to the absorber precooled by the stream from the absorber and then by refrigeration. However, the size of the systems generally involved in many commercial hydrodealkylation units is such that this increased efficiency does not justify the cost involved in going to this more complex system.

Another aspect of this invention results from the discovery that the condensed heavy aromatics in the reactor effluent can be recycled without adverse effect. Therefore, it is not necessary to take the liquid recycle as an overhead material, and it can be taken as the bottoms of a tower producing the high purity benzene product.

In this invention a small portion of the benzene tower bottoms is fed to a tower which produces toluene along with other alkylbenzenes, as the overhead. This tower can serve two purposes. The first is to provide a lean oil for the absorber used to purify the makeup hydrogen. As previously pointed out, fresh liquid feed could be used. However, in some cases the fresh feed may contain substantial benzene in which case it would be advantageous to process both liquid feed and effluent through a common benzene tower. In such case it is necessary to produce the required lean oil as a tower overhead.

The second purpose of this tower is to provide a means of concentrating heavy aromatics in the bottoms for the purpose of purging. Though, as discussed above, these heavy aromatics may be returned to the reactor, they could build up to an extent that would cause operating difficulties. Purging is then necessary to control their level, but purging directly from the bottom of benzene tower would cause a far greater yield loss than this present scheme. It is to be stressed that not all of the bottoms from this tower must be purged; particularly in the case where the first purpose above is the primary purpose the bulk of the bottoms can be returned to the reactor.

In this invention the tower used to put toluene and alkylbenzenes overhead is basically different in design, as well as in size, from the tower needed when all liquid recycle is taken overhead. In the latter case it is necessary to put overhead, even compounds such as diphenyls to avoid a net loss of benzene yield as the entire bottoms cut is purged. The bottoms from such a tower are then extremely heavy. If a reboiler were to be used it would have to be a fired heater. Frequently, to avoid excessive temperature, or the need for vacuum equipment, the heater is placed on the tower feed with the bottoms being stripped by steam.

In this invention as the bottoms purge is such an insignificantly small quantity, even if alkylbenzenes constituted say 50% of the bottoms, the yield loss would be negligible. Leaving alkylbenzenes in the bottoms lowers the temperature of the reboiler to a point where steam reboiling is practical.

Further objects and advantages of the invention will appear from the following description of a preferred form of embodiment thereof and as more particularly shown in the attached drawing which is a schematic flow diagram of a hydrodealkylation unit.

The hydrodealklation unit hereinafter described is adapted to be located in a refinery and is primarily designed to produce high purity benzene from a nitration grade toluene feed.

The required hydrogen for this process is supplied from a catalytic reformer in line 12. It contains the usual hydrocarbon impurities found in such streams. A caustic scrubber 14 is provided in the event this hydogen contains an objectionable quantity of hydrogen sulfide, but it may be bypassed if the quantity is low enough. The hydrogen 16 going to the makeup compressor 18 can be either taken from the caustic scrubber outlet 15 or directly from the catalytic reformer outlet 12 or even as a mixture of the two streams.

The gas from the compressor 18 is cooled by water at 20 and by cold vent hydrogen at 24 to 65° F. It goes to the feed hydrogen absorber 22 where it is contacted with purified recycle toluene 80. The quantity of toluene is adjusted so that the bulk of the $C_5$ and heavier hydrocarbons in 16 are absorbed and carried off in a rich oil 26. This rich oil is sent to an appropriate unit in the refinery for fractionation.

The total toluene feed to the hydrodealkylation unit includes a recycle stream 75 as well as the fresh feed 10. A small portion of this mixture 30 is cooled by water at 32 and propane refrigerant at 33 on 50° F. The amount of feed 30 cooled to 50° F. is set to be amout .08 in mols of the amount of effluent net flash vapor 53. The cooled liquid 30 is fed to vent hydrogen absorber 34 where it recovers benzene from the net vapor effluent 53. The rich oil 36 is returned to the reactor feed line 39.

The mixed reactor feed 39 consisting of liquid, primarily toluene from line 10, and purified hydrogen 38, is heated at 40 by exchange against reactor effluent. At this point a small stream 65 from the stabilizer 60 is added and the total reactor feed heated to about 1200° F. in fired heater 42. It then enters the reactor 44.

The reactor 44 is an internally insulated open chamber containing no catalytic surfaces. The pressure in this reactor is maintained at about 600 p.s.i.g. The reactor is so sized that the residence time of the total feed is in the range of 20–40 seconds. The temperature profile in the reactor is controlled by adding quench gas at appropriate points in the reactor such as 52. The temperature profile is so controlled so that it does not exceed 1350° F. at any point in the reactor. It is also controlled so that about 75% of the toluene in the total feed is converted. At the outlet 55 the reactor effluent is quenched to about 1200° F. by liquid quench 56.

The reactor effluent 46 is then cooled by exchange against reactor feed at 40, by exchange against stabilizer feed at 47, and by water at 48. It is then separated into liquid and vapor in flash chamber 50. Part of the flashed vapor 51 is used to quench the reactor. The net vapor is taken at 53 and cooled to 50° F. in exchanger 54 by propane refrigerant. It then goes to the vent hydrogen absorber 34 and after cooling the incoming feed hydrogen at 23 leaves the unit at 35.

Part of the liquid from flash chamber 50 is taken at 56 and used to quench the reactor effluent. The net liquid 58 is reduced in pressure through a valve 59 and is heated at 47 by exchange against reactor effluent and then goes to the stabilizer 60.

Light hydrocarbon gases which are present in the stabilizer feed 58 are taken overhead at 62. In addition, a small sidestream is taken at 65, a few trays from the top, and returned to the reactor. This sidestream is primarily benzene, but contains hydrocarbon impurities which are destroyed by hydrocracking in the reactor 44.

The bottoms from the stabilizer 60 are taken at 66 as feed to the clay tower 68. The operating pressure of the stabilizer 60 is maintained at that necessary to give a bottoms temperature of about 425° F. This enables the bottoms 66 to go directly to the clay tower without intermediate heating. The stabilizer is furnished with a reboiler 64 using high pressure steam.

The clay tower effluent 69 goes directly to the benzene tower 70. This is a conventional fractionator operating at essentially atmospheric pressure and reboiled at 76 by low pressure steam. High purity benzene product is taken as the overhead product at 72.

The bottoms 74 from the benzene tower is primarily toluene. The bulk of the bottoms is returned to the reactor by line 75. A small part, about 20% of the total bottoms, is sent by line 77 to the toluene tower 78.

The toluene tower 78 is run at atmospheric pressure and is reboiled with high pressure steam at 83. The overhead 80 is essentially pure toluene and is used as the lean oil for the feed hydrogen absorber 22.

The bottoms 82 from the toluene tower 78 are heavy aromatics along with sufficient toluene to sufficiently lower the bottoms temperature to permit steam reboiling at 83. The heavy aromatics are largely diphenyl compounds with small amounts of heavier condensed aromatics, such as anthracene. To prevent a buildup of these very heavy compounds a small part of the bottoms 82 is purged. However, the bulk of the bottoms 82 is recycled to the reactor section by line 75.

The refrigeration for this unit is provided by a conventional propane system. It includes a compressor 86 which handles the vaporized propane 85 and compresses it to a pressure such that it can be condensed by water at 87. The propane liquid then expands through valve 88 and goes to its cooling services, including exchangers 54 and 33.

It will be understood that the foregoing description and disclosure does not include all of the customary valves, controls and interconduit heat exchangers but it will be appreciated that temperatures are readily controlled and heat recovered in the well known manner.

Generally hydrodealkylation operations are conducted in the temperature range of 1100–1500° F. and by our process, temperature differences can be kept at 200° F. or less. The operating pressures are normally in the range of 500 to 800 p.s.i.g. with a reaction time within the period of 10 to 50 seconds. There will be at least 2 mols of hydrogen per mol of liquid aromatic feed.

While we have shown and described a preferred form of embodiment of our invention, we are aware that modifications may be made thereto within the scope and spirit of our description herein and only such limitations should be made thereto as come within the terms of the claims appended hereinafter.

We claim:

1. The process of dealkylating alkylated aromatic hydrocarbons at a conversion rate of at least 60% per pass to produce aromatic hydrocarbons of a lower molecular weight which comprises contacting the alkylated aromatic hydrocarbons in a reaction zone at a temperature between 1100° F. and 1500° F. and at a pressure between about 500 p.s.i.g. and 800 p.s.i.g. with a hydrogen rich gas, said contacting being carried out in the substantial absence of solids or surfaces which would tend to catalyze the reaction, quenching the reaction with hydrogen to maintain a temperature difference in the reaction zone between maximum and minimum reaction temperatures of not to exceed about 200° F., cooling the reaction effluent from the reaction zone to stop the reaction, separating unreacted alkylated aromatic hydrocarbons and impure hydrogen from the reaction effluent, returning the unreacted alkylated aromatic hydrocarbons back to the reaction zone to increase the ultimate yield of aromatic hydrocarbons, and passing impure feed hydrogen in countercurrent contact with alkylbenzene at temperatures below ambient thereby removing hydrocarbons and reducing hydrogen consumption in the reaction zone.

2. The process of dealkylating alkylbenzene hydrocarbons as claimed in claim 1 wherein the effluent from the reaction zone is fractionated in a benzene tower and a small portion of the bottoms is sent to a second tower to produce alkylbenzenes free from heavier aromatics as overhead and concentrate heavy aromatics as bottoms, said alkylbenzenes from the second tower are used for purifying said feed hydrogen, and wherein each tower is steam reboiled at atmospheric pressure.

3. The process of dealkylating alkylated aromatic hydrocarbons as claimed in claim 1 wherein the vent hydrogen from the reaction zone is cooled with refrigeration and then cools the impure feed hydrogen.

4. The process of dealkylating alkylated aromatic hydrocarbons at a conversion rate of at least 60% per pass to produce aromatic hydrocarbons of a lower molecular weight which comprises contacting the alkylated aromatic hydrocarbons in a reaction zone at a temperature between 1100° F. and 1500° F. and at a pressure between about 500 p.s.i.g. and 800 p.s.i.g. with a hydrogen rich gas, said contacting being carried out in the substantial absence of solids or surfaces which would tend to catalyze the reaction, quenching the reaction with hydrogen to maintain a temperature difference in the reaction zone between maximum and minimum reaction temperatures of not to exceed about 200° F., cooling the reaction effluent from the reaction zone to stop the reaction, separating unreacted alkylated aromatic hydrocarbons and an impure hydrogen vent gas from the reaction effluent, returning the unreacted alkylated aromatic hydrocarbons back to the reaction zone to increase the ultimate yield of aromatic hydrocarbons, and scrubbing the vent gas with a portion of the reactor liquid feed to recover benzene.

5. The process of dealkylating alkylated aromatic hydrocarbons as claimed in claim 4 wherein the contact in the scrubbing step takes place at 40°–60° F. with the liquid feed rate being .005–.025 by mol of the vapor at 550 p.s.i.g.

6. The process of dealkylating alkylbenzene hydrocarbons at a conversion rate of at least 60% per pass to produce aromatic hydrocarbons of a lower molecular weight which comprises contacting the alkylbenzene hydrocarbons in the reaction zone at a temperature between 1100° F. and 1500° F. and at a pressure between about 500 p.s.i.g. and 800 p.s.i.g. with a hydrogen rich gas, said contact being carried out in the substantial absence of solids or surfaces which would tend to catalyze the reaction, quenching the reaction with a recycle hydrogen stream to maintain a temperature difference in the reaction zone between maximum and minimum reaction temperatures of not to exceed about 200° F., cooling the reaction effluent from the reaction zone to stop the reaction, separating product benzene and impure hydrogen from the reaction effluent, cooling said impure hydrogen and using said cold impure hydrogen as the recycle hydrogen quench stream and returning substantially all of the remaining liquid effluent containing the unreacted alkyl benzene hydrocarbons back to the reaction zone to increase the ultimate yields of aromatic hydrocarbons.

References Cited by the Examiner

UNITED STATES PATENTS

| | | | |
|---|---|---|---|
| 3,171,862 | 2/1965 | Larkins et al. | 260—672 |
| 3,193,593 | 7/1965 | Eubank | 260—672 |
| 3,204,007 | 8/1965 | Mukai et al. | 260—672 |

DELBERT E. GANTZ, *Primary Examiner.*

G. E. SCHMITKONS, *Assistant Examiner.*